US008989483B2

(12) United States Patent
Cheng et al.

(10) Patent No.: US 8,989,483 B2
(45) Date of Patent: Mar. 24, 2015

(54) METHOD AND APPARATUS FOR INFERRING THE GEOGRAPHIC LOCATION OF CAPTURED SCENE DEPICTIONS

(75) Inventors: Hui Cheng, Bridgewater, NJ (US); Harpreet Singh Sawhney, West Windsor, NJ (US); Bogdan Calin Mihai Matei, Princeton Junction, NJ (US); Zhiwei Zhu, Princeton, NJ (US); Nicholas John Vander Valk, Monmouth Junction, NJ (US)

(73) Assignee: SRI International, Menlo Park, CA (US)

( * ) Notice: Subject to any disclaimer, the term of this patent is extended or adjusted under 35 U.S.C. 154(b) by 185 days.

(21) Appl. No.: 13/493,654

(22) Filed: Jun. 11, 2012

(65) Prior Publication Data

US 2012/0314935 A1 Dec. 13, 2012

Related U.S. Application Data

(60) Provisional application No. 61/495,765, filed on Jun. 10, 2011, provisional application No. 61/495,777, filed on Jun. 10, 2011.

(51) Int. Cl.
*G06K 9/00* (2006.01)
(52) U.S. Cl.
CPC .................. *G06K 9/00671* (2013.01)
USPC ........................................ 382/154
(58) Field of Classification Search
USPC ........................................ 382/154
See application file for complete search history.

(56) References Cited

U.S. PATENT DOCUMENTS

| | | | | |
|---|---|---|---|---|
| 2006/0285172 | A1* | 12/2006 | Hull et al. | 358/448 |
| 2009/0083275 | A1* | 3/2009 | Jacob et al. | 707/10 |
| 2010/0198684 | A1* | 8/2010 | Eraker et al. | 705/14.49 |
| 2011/0064312 | A1* | 3/2011 | Janky et al. | 382/195 |
| 2011/0123120 | A1* | 5/2011 | Quack | 382/197 |
| 2011/0176734 | A1* | 7/2011 | Lee et al. | 382/197 |
| 2013/0129142 | A1* | 5/2013 | Miranda-Steiner | 382/103 |

FOREIGN PATENT DOCUMENTS

JP 2011129006 A * 6/2011

OTHER PUBLICATIONS (Alison Brown and Randy Silvia, "Video-Aides GPC/INS Positioning and Attiude Determination", 2006, NTIS Search).*
(Robert Collins, "Automatic Extraction of Buildings and Terrain from Aerial Images",1995,Citeseer).*

(Continued)

*Primary Examiner* — Stephen R Koziol
*Assistant Examiner* — Totam Le
(74) *Attorney, Agent, or Firm* — Moser Taboada

(57) ABSTRACT

A method and apparatus for determining a geographic location of a scene in a captured depiction comprising extracting a first set of features from the captured depiction by algorithmically analyzing the captured depiction, matching the extracted features of the captured depiction against a second set of extracted features associated with reference depictions with known geographic locations and when the matching is successful, identifying the geographic location of the scene in the captured depiction based on a known geographic location of a matching reference depiction from the reference depictions.

20 Claims, 14 Drawing Sheets

(56) References Cited

OTHER PUBLICATIONS (Grabiel Takacs, "Outdoors Augmented Reality on Mobile Phone using Loxel-Based Visual Feature Organization", 2008, MIR'08, Vancouver, British Columbia, Canada).*

T. Cham, A. Ciptadi, W. Tan, M. Pham, and L. Chia, "Estimating Camera Pose From a Single Urban Ground-View Omnidirectional Image and a 2D Building Outline Map", in CVPR, 2010.

Y. Chung, T. Han, and Z. He, "Building Recognition Using Sketch-Based Representations and Spectral Graph Matching", in ICCV, 2010.

R. Cipolla, D. Robertson, and B. Tordoff, "Image-Based Localisation". Proc. 10th Int. Conf. on Virtual Systems and Multimedia, 2004.

S. Coorg and S. Teller, "Extracting Textured Vertical Facades From Controlled Close-Range Imagery", in CVPR, 1999.

P. Doubek, J. Matas, M. Perdoch, and O. Chum, "Image Matching and Retrieval by Repetitive Patterns", ICPR, 2010.

J. Kosecka and W. Zhang, "Video Compass", in ECCV, 2002.

J. Kosecka and W. Zhang, "Extraction, Matching, and Pose Recovery Based on Dominant Rectangular Structures", CVIU, 2005.

P. Mueller, G. Zeng, P. Wonka, and L. Van Gool, "Image-Based Procedural Modeling of Facades", in ACM SIGGRAPH, 2007.

M. Park, K. Brocklehurst, R. Collins, and Y. Liu, "Deformed Lattice Detection in Real-World Images Using Mean-Shift Belief Propagation", TPAMI, 31(10):1804-1816, 2009.

D. Robertson and R. Cipolla, "An Image-Based System for Urban Navigation", BMVC, pp. 819-828, 2004.

F. Schaffalitzky and A. Zisserman, "Geometric Grouping of Repeated Elements Within Images. Shape, Contour and Grouping in Computer Vision", pp. 81-81, 1999.

G. Schindler, P. Krishnamurthy, R. Lublinerman, Y. Liu, and F. Dellaert, "Detecting and Matching Repeated Patterns for Automatic Geo-Tagging in Urban Environments", in CVPR, 2008.

E. Shechtman and M. Irani, "Matching Local Self-Similarities Across Images and Videos", in CVPR, 2007.

W. Zhang and J. Kosecka, "Image Based Localization in Urban Environments", in Proc. Int. Symp. on 3D Data Processing, Visualization, and Transmission (3DPVT), 2006.

Matei, H. Sawhney, S. Samarasekera, J. Kim and R. Kumar, "Building Segmentation for Densely Built Urban Regions Using Aerial LIDAR Data", CVPR 2008.

R. Hartley, "In Defense of the 8-point Algorithm", GE-Corporate Research and Development, Schnectady, NY, 12309, 8 pages, no date.

M. Park, J. Luo, R. Collins, and Y. Liu, "Beyond GPS: Determining the Camera Viewing Direction of a Geotagged Image", in ACM-MM, 2010.

* cited by examiner

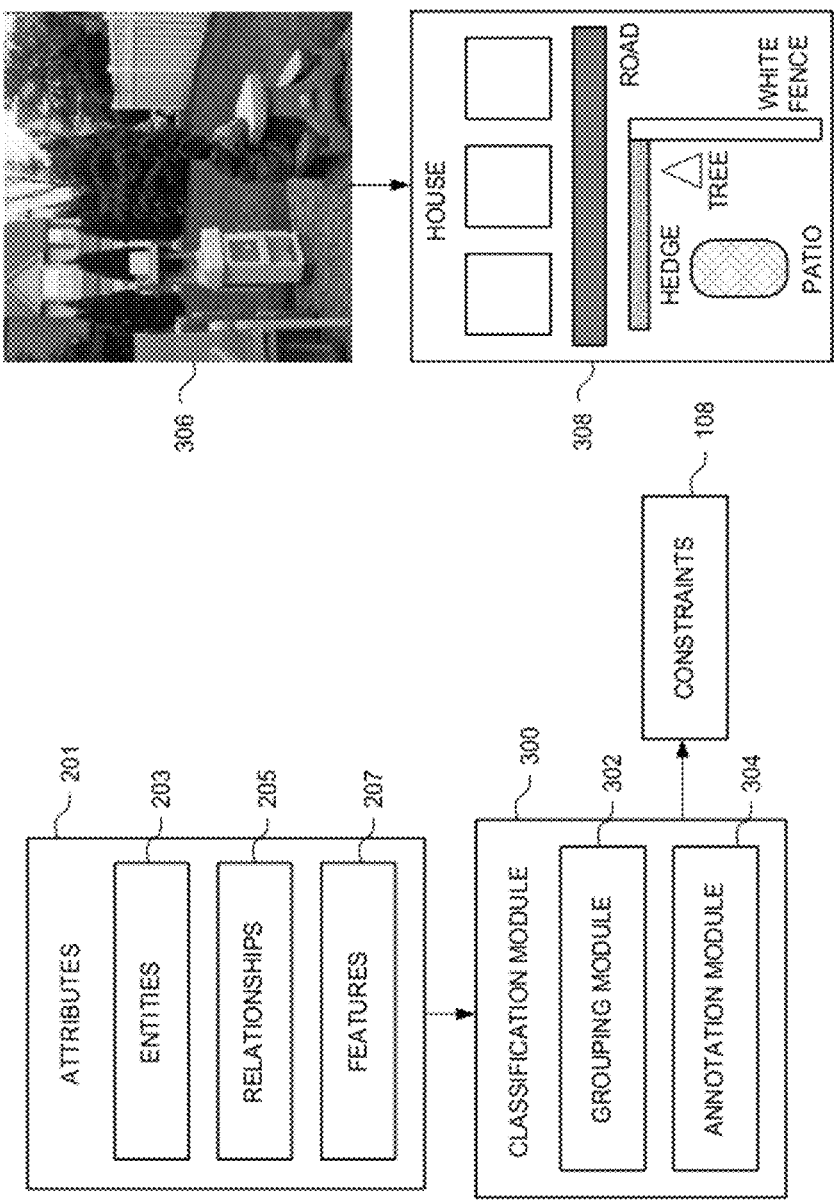

METHOD AND APPARATUS FOR INFERRING THE GEOGRAPHIC LOCATION OF CAPTURED SCENE DEPICTIONS

CROSS-REFERENCE TO RELATED APPLICATIONS

This application claims the benefit of U.S. provisional patent application Nos. 61/495,765 and 61/495,777 both filed Jun. 10, 2011, the disclosures of which are incorporated herein by reference in their entirety.

GOVERNMENT INTEREST

Governmental Interest—The invention described herein was made with Government support under contract number W91CRB-08-C-0117 awarded by the U.S. Army. This invention was also made with Government support under contract number HM1582-09-C-0017 awarded by the National Geospatial Intelligence Agency. The Government has certain rights in the invention.

BACKGROUND OF THE INVENTION

1. Field of the Invention

Embodiments of the present invention generally relate to geolocalization and, more particularly, to a method and apparatus for inferring the geographic location of scenes in captured scene depictions using geo-referenced data.

2. Description of the Related Art

Determining the geographic location of scenes in captured depictions (here "depiction" is used inclusively for electronic data that represents the contents of a scene, regardless of medium, including photographs and other still images, video sequences, drawings, and/or textual descriptions of the contents of a scene for example), is referred to as geolocalization of content. Traditional approaches for geolocalization rely on expressly encoded location data (e.g., metadata), that is either embedded within the depiction itself or associated with it, such as global positioning system (GPS) coordinates and the like. If such metadata is not available, geolocalization of a depiction such as an image is a challenging problem.

The location of an aerial or satellite image is sometimes determined by comparing the image to an existing geo-referenced database of satellite images and selecting a statistically matched item as the result. However, such image comparisons do not account for angle discrepancies, for example, where the images in the database are top-view or aerial imagery, and the images required to be geolocalized consist of narrow field of view ground plane images such as tourist images in an urban or suburban environment. Thus, with two or three multiple coordinate systems and angles of view, performing image comparisons becomes computationally challenging.

Therefore, there is a need in the art for geolocalizing scene depictions such as images and, more particularly, a method and apparatus for inferring the geographic location of captured depictions using geo-referenced data captured from a different perspective.

SUMMARY OF THE INVENTION

An apparatus and/or method for inferring the geographic location of scenes in captured depictions using geo-referenced data, substantially as shown in and/or described in connection with at least one of the figures, as set forth more completely in the claims.

Various advantages, aspects and features of the present disclosure, as well as details of an illustrated embodiment thereof, are more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A depicts a block diagram of a classification module of the geolocalization module in FIG. 1 in accordance with at least one embodiment of the present invention;

FIG. 3B illustrates an example of a captured depiction and the corresponding semantic object representation in accordance with at least one embodiment of the present invention;

DETAILED DESCRIPTION

Embodiments of the present invention generally relate to determining the geographic location of a captured depiction whose location is unknown, using other geo-referenced depiction data captured from a different perspective. According to one embodiment, the captured depictions are narrow field of view (NFOV), ground plane, and/or street view (SV) images, and the method determines the geographic location of the scene depicted in a captured image by extracting a set of features from a database of reference depictions, which, according to some embodiments include satellite (SAT) imagery, three-dimensional (3D) model data and oblique bird's eye view (BEV) images, i.e., oblique aerial imagery, of an area of interest. In an exemplary embodiment, feature extraction includes annotating those images with the objects that they are determined to contain such as trees, bushes, houses, and the like. In some embodiments, the database includes hyperspectral (HS), multispectral (MS) as well as standard imagery. The captured NFOV images are also annotated, and the respective annotations for a captured depiction and the reference depictions are compared, e.g. using a statistical method, to determine a best match. The geographic location of the captured depiction, such as an image, can be identified, by reference to the known geographic location of the matching referencing depiction.

Figure 1:
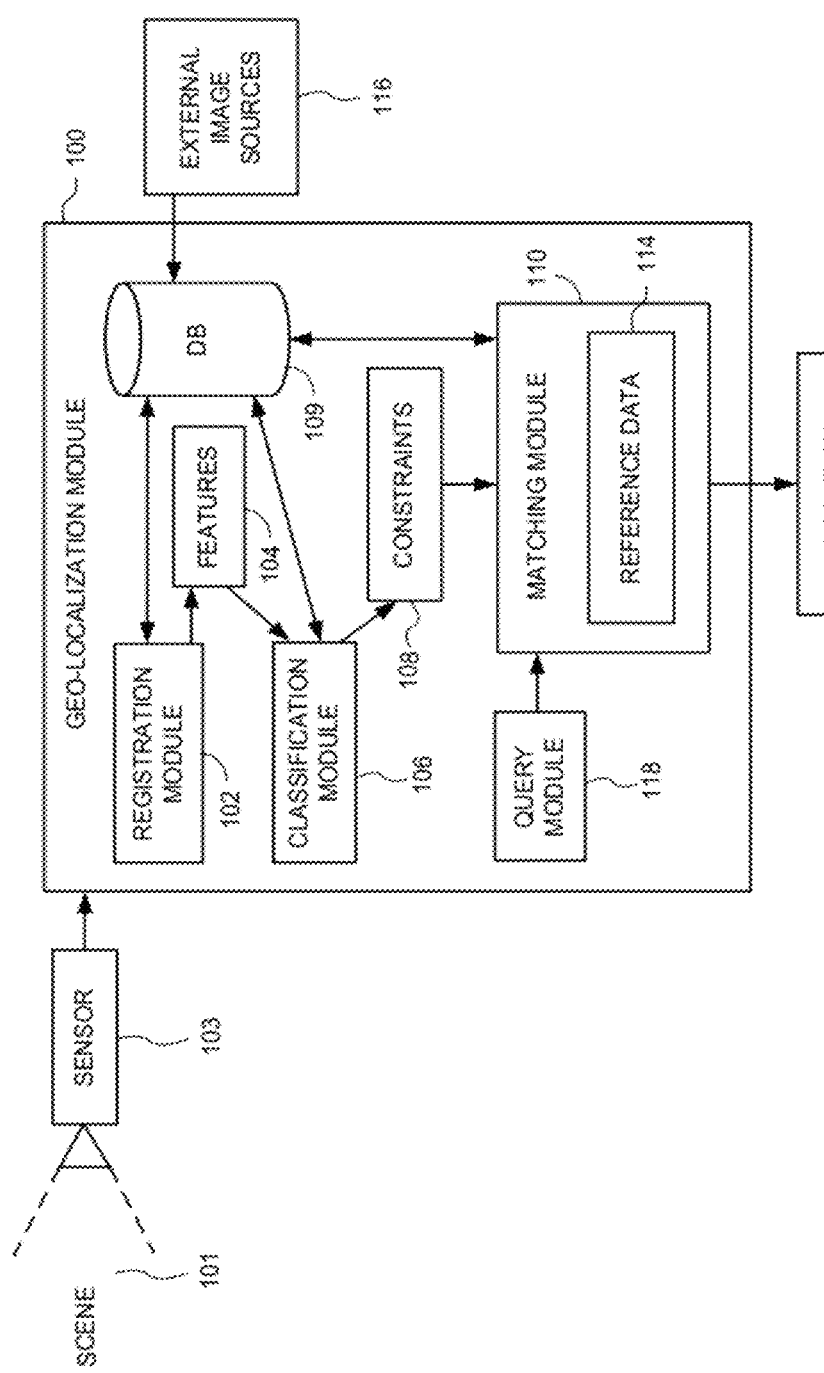
FIG. 1 depicts a functional block diagram of a geolocalization module for determining the geographic location of captured depictions using geo-referenced depictions in accordance with at least one embodiment of the present invention.

FIG. 1 depicts a functional block diagram of a geolocalization module 100 for inferring the geographic location of captured depictions using geo-referenced depictions in accordance with at least one embodiment of the present invention. In one embodiment, a sensor 103 senses a scene 101 and creates one or more captured depictions of that scene, which are transmitted to the geolocalization module 100. In other embodiments, there are multiple sensors and multiple scenes to be sensed. According to an exemplary embodiment the sensor is a still camera and the sensed scene is recorded as a captured still image. In other embodiments, the sensor is a video camera and the sensed scene is recorded as a video sequence. In still other embodiments, the captured depiction might be a graphical or textual description of the scene prepared by a human user and submitted to geolocalization module 100. The geolocalization module 100 comprises a registration module 102, a classification module 106, a matching module 110 and a database 109. The database 109 is a database populated by external sources of depictions 116. In one embodiment, the external sources 208 provide depictions including satellite images (SAT), oblique aerial imagery, hyper-spectral imagery (HSI), multispectral imagery (MSI), standard images, vector and map data, three-dimensional models of digital terrain models (DEM), laser detection and ranging (LADAR) data, light detection and ranging (LIDAR) data and the like, collectively referred to as reference data. In one embodiment, the images of database 109 represent scenery within a particular geographical area of interest, i.e., an area within which scene 101 is known or presumed to be located, and the challenge to identify the location of scene 101 more precisely is thus helpfully constrained.

The captured/sensed depictions are presented to the registration module 102. The registration module 102 annotates the captured depictions by extracting features of the depictions. For example, in one embodiment, module 102 recognizes and extracts entities or objects present in the captured depictions, adjusts for pose of the sensor 103 (in embodiments where pose is known or can be readily computed), and determines relationships between the detected entities. The annotations made by registration module 102 thus represent knowledge of the various types of objects present in e.g. a captured image. According to this embodiment, the registration module 102 similarly annotates reference depictions within database 109 of the particular area of interest which covers the general location of scene 101. The registration module 102 creates a set of extracted features 104 which comprise objects such as describable houses, buildings, trees, patios and the like as well as features or aspects of such objects, for example, corners of buildings, facades and the like.

The extracted features 104 are transmitted into the classification module 106 which classifies the extracted features 104 into one or more semantic classes, used as an internal data representation. In one embodiment, the semantic classes include, but are not limited to, houses, trees, bushes, patios, desks, roads, intersections, hedges, fences, pools and unclassified objects. According to some embodiments, the extracted features 104 may also include a color description to aid in matching. Constraints 108 are formed from these classes. According to one embodiment, constraints comprise one or more of feature similarity constraints, geometrical constraints, topological constraints, and/or geospatial constraints, and may also include other image attributes.

The constraints 108 derived from the captured depiction are coupled to the matching module 110 along with the extracted entities/features 104. The matching module 110 matches the constraints 108 against a corresponding set of constraints derived from the reference depictions in database 109, comprising a statistical representation of the entities and their associated classes for an area of interest. The matching module 110 determines whether a match exists, for example by assessing whether when the constraints 108 and the constraints derived from a given depiction of the reference data are sufficiently close, e.g. within some (e.g. predetermined) threshold value of each other. In some embodiments, extracted entities/features 104 are similarly matched. Once a sufficiently close match is found, a geographic location 112 is determined for the captured depiction of scene 101 by reference to the known geographic location of the match in database 109.

In various embodiments, the sensor 103 is used to sense a corresponding variety of scenes, such as terrain, urban imagery, and other real-world scenery.

According to some embodiments, the geolocalization module 100 further comprises a query module 118. The query module 118 is used to construct a geographically indexed database of the captured depictions using a plurality of matched captured depictions. The query module 118 further provides an interactive search engine responsive to a query specifying a geographic location by returning one or more of the captured depictions whose corresponding derived location matches the location specified by the query. According to some embodiments, the captured depictions are displayed on an interactive map corresponding to their matched locations in the reference depiction data.

Figure 2:
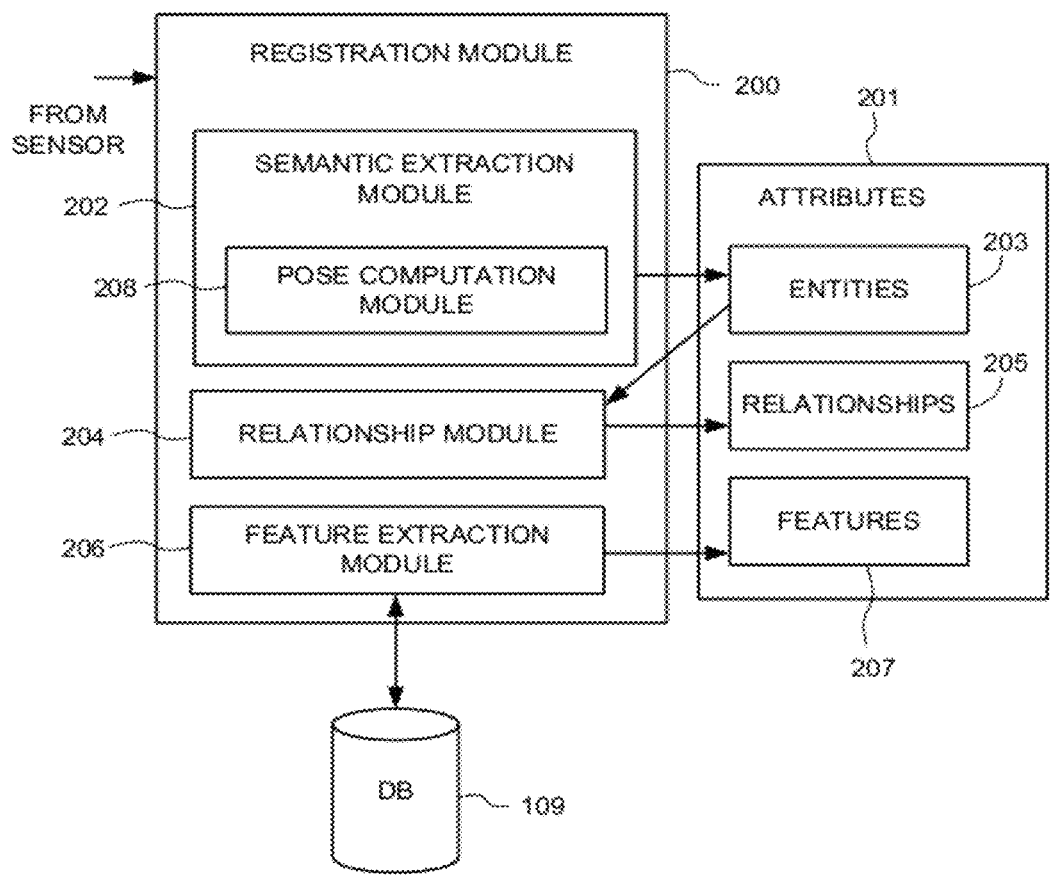
FIG. 2 depicts a block diagram of a registration module of the geolocalization module in FIG. 1 in accordance with at least one embodiment of the present invention.

FIG. 2 depicts a block diagram of a registration module 200 of the geolocalization module 100 in FIG. 1 in accordance with at least one embodiment of the present invention. The registration module (RM) 200 comprises a semantic extraction module (SEM) 202, a relationship module (RELM) 204 and a feature extraction module (FEM) 206. In one embodiment, SEM 202 further comprises a pose computation module (PCM) 208. The RM 200 receives the captured depictions from the sensor 103 shown in FIG. 1. The RM 200 generates attributes 201 of the captured depictions using the various modules. The RM 200 redirects the captured depictions to the SEM 202. The SEM 202 generates entities 203 from each captured depiction. The entities, as discussed above, represent objects such as trees, roads, houses, hedges, fences, and the like contained in the captured depiction. For example, the captured depiction may be a picture of a backyard in a neighborhood, and the database 109 is populated with a reference image of the neighborhood annotated for semantic objects. The backyard photograph will be semantically tagged with descriptors showing which objects are present in the photograph, i.e., three trees, one hedge, a picnic table and a brown fence.

The RELM 204 determines relationships between the entities 203. For example, if the backyard photo contains three trees, one hedge, a picnic table and a brown fence, the RELM 204 determines that the trees are lined up in parallel, at a ninety degree angle to the brown fence on one side, and the hedge on the other side, and the picnic table is at the midpoint between the fence and the hedge. These descriptors are collectively referred to as relationships 205 and are stored in the attributes 201. The FEM 206 extracts features 207 in the captured image and stores the features in the attributes 201.

FIG. 3A depicts a block diagram of a classification module 300 of the geolocalization module 100 in FIG. 1 in accordance with at least one embodiment of the present invention. The classification module 300 is comprised of a grouping module 302 and an annotation module 304. The classification module 300 receives the entities 203 as input as part of the attributes 201 shown in FIG. 2. The grouping module 302 separates the entities 203 into classes such as those described above.

Figure 3C:
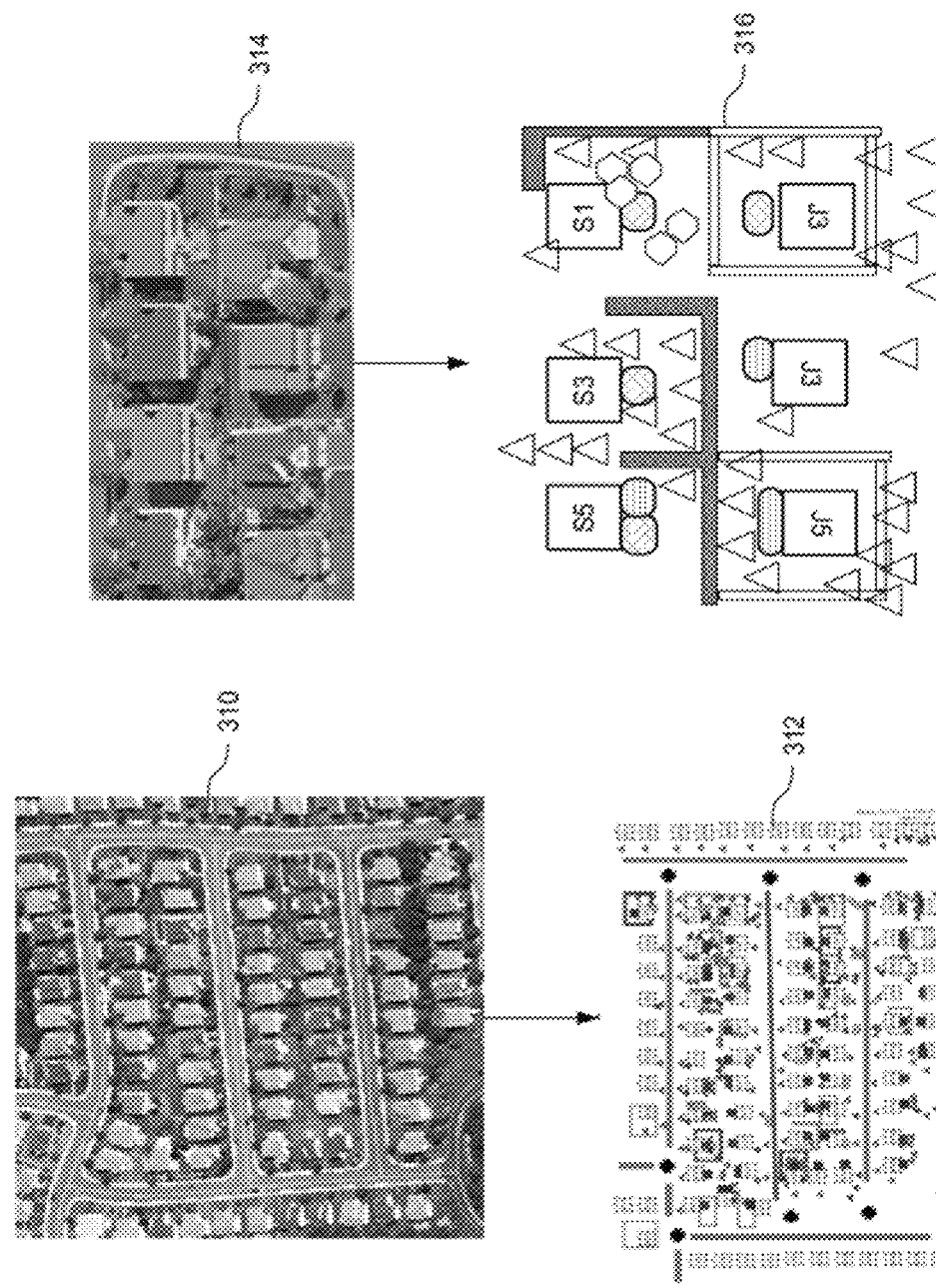
FIG. 3C illustrates an example of a satellite image and a bird's eye view image and their corresponding object representation in accordance with at least one embodiment of the present invention.

For example, if the captured image is a photograph of the backyard 306 as shown in FIG. 3B, there would be four groups: trees, hedge, fence and table. The tree group contains three entries and each other group only contains one entry, or similar to shown in the semantic object representation 308. FIG. 3C illustrates a satellite image 310 and its corresponding semantic map 312 as well as bird's eye view image 314 and its representative semantic map 316. In some embodiments, annotation module 304 allows a user of the geolocalization module 100 to additionally annotate the captured image for complete semantic description. The classification module 300 forms a set of constraints 108 based on the grouping and annotation and transmits the constraints to the matching module 110 shown in FIG. 1.

Figure 4:
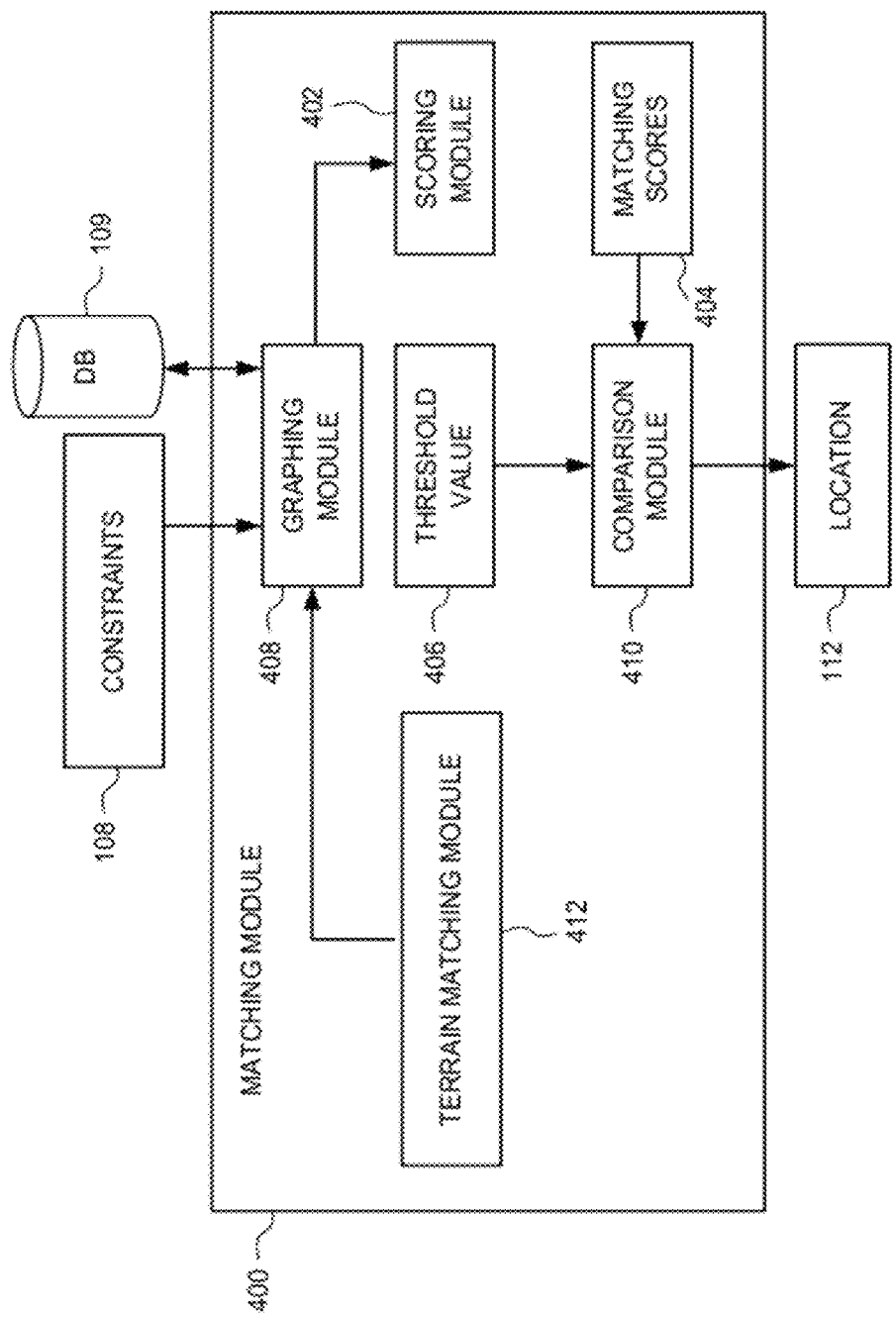
FIG. 4 depicts a block diagram of a matching module of the geolocalization module in FIG. 1 in accordance with at least one embodiment of the present invention.

FIG. 4 depicts a block diagram of a matching module 400 of the geolocalization module 100 in FIG. 1 in accordance with at least one embodiment of the present invention. In an exemplary embodiment, the matching module 400 comprises a scoring module 402, a graphing module 408, a comparison module 410 and a terrain matching module 412. The matching module 400 is coupled to the database 109 shown in FIG. 1 and receives the constraints 108 from the classification module 106 as shown in FIG. 1. The scoring module 402 receives images (e.g. SAT images) of buildings from the database 109 and computes matching scores for each building shown in the image in every direction. The scoring module 402 also performs the same matching score computation based on the constraints 108 and the captured image.

Subsequently, the entities of the captured image and the satellite images are transferred to a data structure, for example, semantic concept graphs (SCGs) by the graphing module 408. A semantic concept graph is a graphical representation of the hierarchical relationships between the entities in a particular captured image, satellite image, or bird's eye view image. SCGs may have hard or soft edges indicating the strength of the relationships and are enhanced using existing geographic information system (GIS) data. The comparison module 410 compares the extracted features of the captured depiction with the extracted features of the reference depictions stored in database 109 and determines a first set of candidate matches based on a first matching score. If there is a set of matches found, a second matching score is calculated between the extracted features for the captured depiction and the set of candidate matches, respectively. If the second matching score for a best one of the candidate matches satisfies a threshold value 406 (where, according to one embodiment, the threshold value is configured by a user of the geolocalization module 100), the captured depiction is determined to have successfully matched with the best candidate from the reference depictions. The matching module 400 returns the known geographical location 112 of the successfully matching reference depiction from the satellite and bird's eye view images of database 109.

Figure 5:
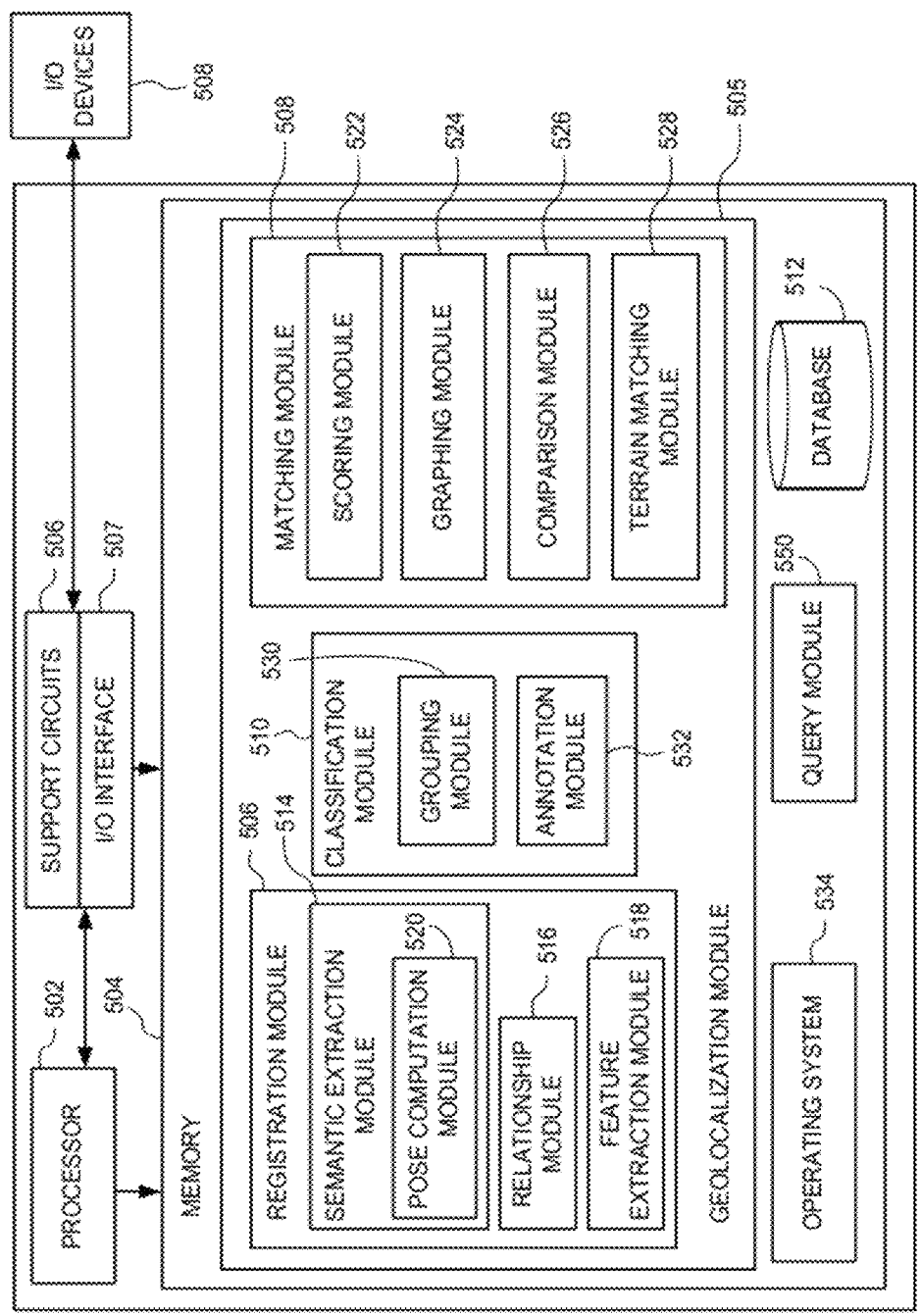
FIG. 5 depicts an implementation of the geolocalization module of FIG. 1 as a computer in accordance with at least one embodiment of the present invention.

FIG. 5 depicts an implementation of the geolocalization module 100 of FIG. 1 as computer 500 in accordance with at least one embodiment of the present invention. In some embodiments, module 100 may be implemented using a plurality of such computers, for example a group of servers. The computer 500 may be used to implement the registration module 506, the matching module 508 and the classification module 510 of the geolocalization module 100. The computer 500 includes a processor 502, various support circuits 506, and memory 504. The processor 502 may include one or more microprocessors known in the art. The support circuits 506 for the processor 502 include conventional cache, power supplies, clock circuits, data registers, I/O interface 507, and the like. The I/O interface 507 may be directly coupled to the memory 504 or coupled through the supporting circuits 506. The I/O interface 507 may also be configured for communication with input devices and/or output devices such as network devices, various storage devices, mouse, keyboard, display, and the like.

The memory 504, or computer readable medium, stores non-transient processor-executable instructions and/or data that may be executed by and/or used by the processor 502. These processor-executable instructions may comprise firmware, software, and the like, or some combination thereof. Modules having processor-executable instructions that are stored in the memory 504 comprise a registration module 506, a matching module 508 and a classification module 510. As described below, in an exemplary embodiment, the registration module 506 comprises a semantic extraction module 514, a relationship module 516 and a feature extraction module 518. The matching module 508 comprises a scoring module 522, a graphing module 524, a comparison module 526 and a terrain matching module 528. The classification module 510 comprises, in an exemplary embodiment, a grouping module 530 and an annotation module 523. The memory 504 also stores a database 512. The computer 500 may be programmed with one or more operating systems (generally referred to as operating system (OS) 534), which may include OS/2, Java Virtual Machine, Linux, Solaris, Unix, HPUX, AIX, Windows, Windows95, Windows98, Windows NT, and Windows2000, Windows ME, Windows XP, Windows Server, among other known platforms. At least a portion of the operating system 534 may be disposed in the memory 504. The memory 504 may include one or more of the following random access memory, read only memory, magneto-resistive read/write memory, optical read/write memory, cache memory, magnetic read/write memory, and the like, as well as signal-bearing media as described below.

Figure 6:
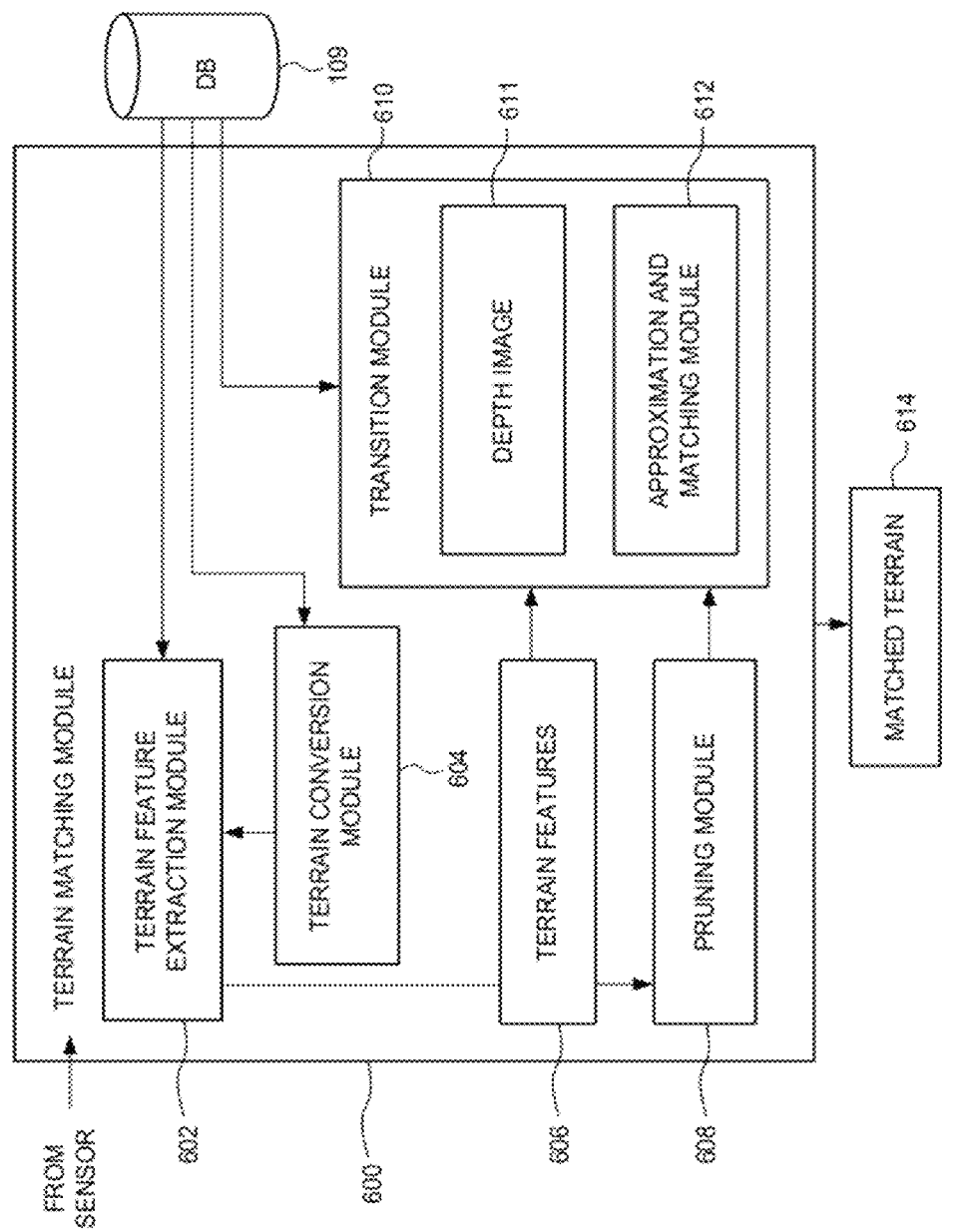
FIG. 6 depicts a functional block diagram of the terrain matching module of the geolocalization module in FIG. 1 in accordance with at least one embodiment of the present invention.

FIG. 6 depicts a functional block diagram of the terrain matching module 600 of the geolocalization module 100 in FIG. 1 in accordance with at least one embodiment of the present invention. The terrain matching module 600 comprises a terrain feature extraction module (TFEM) 602, a terrain conversion module (TCM) 604 a pruning module 608 and a transition module 610. The TFEM 602 receives the captured image from the sensor 103 in FIG. 1 and coupled with the terrain conversion module 604. The terrain conversion module 604 extracts three dimensional (3D) terrain data from the database 109 and converts the terrain into heightmaps and transmits the heightmaps to the TFEM 602. The TFEM 602 then extracts terrain features 606 from the terrain. According to one embodiment, the terrain features comprise ridges, skylines, basins, peaks, borders and the like. The pruning module 608 prunes out features based on descriptive identifiers such as ridge length and curvature.

The transition module 610 is coupled to the database 109 and the pruning module 608. The transition module 610 receives the terrain features 606 and the 3D terrain data from database 109 and converts the terrain data into a plurality of depth images 611 at each of a plurality of points in the 3D terrain. The depth images 611 provide a basis on which to match the pruned features and the depth images 611 in the approximation and matching module (AMM) 612. According to one embodiment, the AMM uses polyline approximation to establish a skyline feature of the captured image terrain and the 3D terrain from the depth image 611, as discussed with regard to FIGS. 12 and 13 in detail below. The result of the terrain matching module 600 is matched terrain 614, assisting in geolocalizing a particular photograph.

Figure 7:
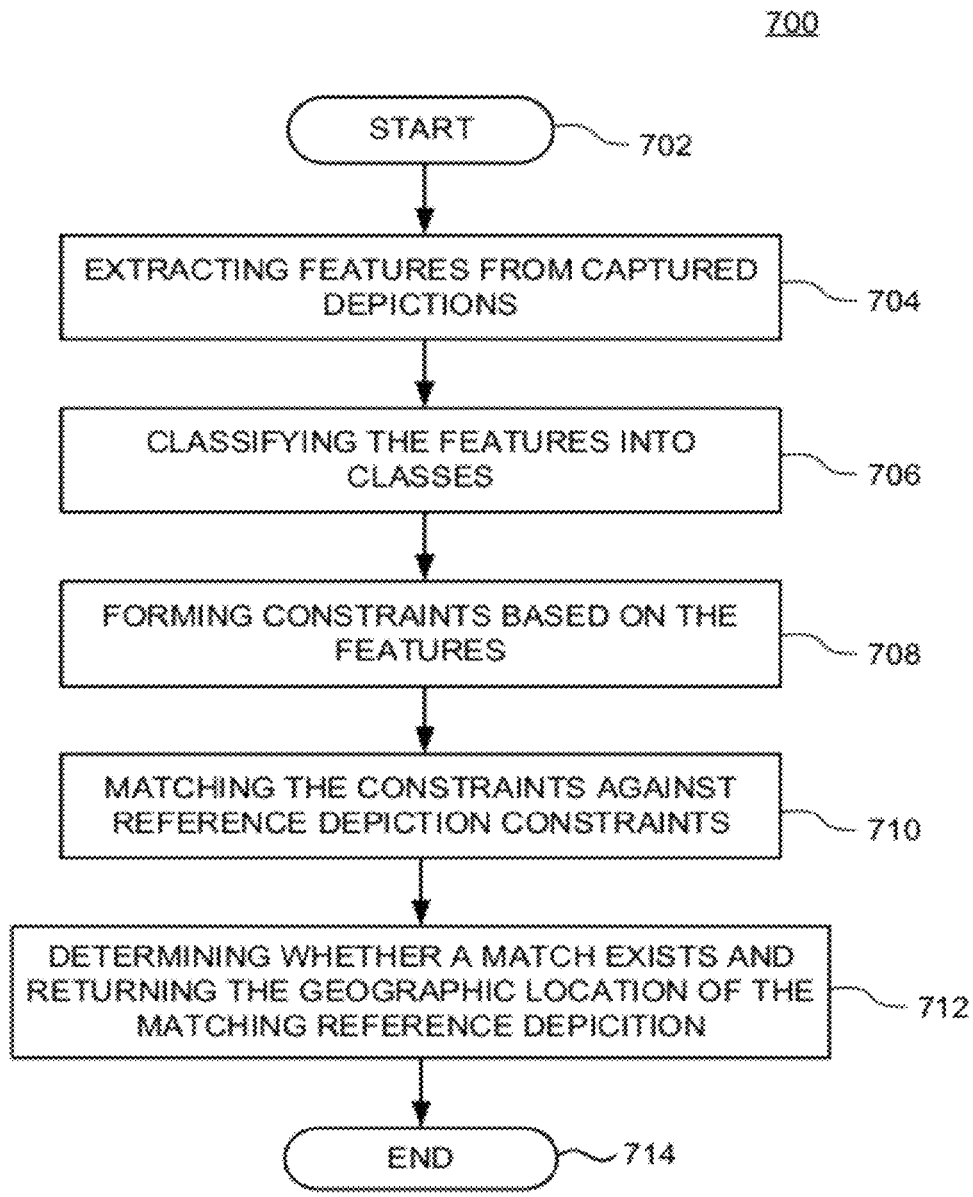
FIG. 7 depicts a flow diagram of a method for inferring the geographic location of captured depictions using geo-referenced data in accordance with at least one embodiment of the present invention.

FIG. 7 depicts a flow diagram of a method 700 for determining the geographic location of captured depictions using geo-referenced depictions in accordance with at least one embodiment of the present invention. The method 700 represents the execution of the geolocalization module stored in memory 504 as executed by processor 502. The method 700 starts at step 702 and proceeds to step 704.

At step 704, features are extracted from a captured depiction by the registration module 102. In one embodiment, the depiction is transmitted to the method 700 via a network. In another embodiment, the depiction is transmitted to the method 700 via sensor 103 coupled to the geolocalization module 100 as shown in FIG. 1. In other embodiments, a plurality of images forming a video stream is transmitted to the geolocalization module 100 and the method 700 operates on the streaming video. In some embodiments, relationships among the extracted features are also extracted. For example, the geospatial or topological relationship among various trees, hedges, fences, and the like are extracted from the captured image. Features of the image such as long edges, landmarks and the like are also extracted. Collectively, these extracted features are attributes of the image (or other depiction) that will next be used to classify the depiction and form constraints.

At step 706, the extracted features are classified into semantic classes by the classification module 106. In one embodiment, the semantic classes include, but are not limited to, houses, trees, bushes, patios, desks, roads, intersections, hedges, fences, pools and unclassified objects. According to some embodiments, the extracted features 102 may also include a color description to aid in matching.

At step 708, constraints are formed based on the classes of extracted features and the attributes of the captured depiction by the classification module 106. The constraints are used in removing comparisons which are clear mismatches with the captured image. For example, if a particular sector of the AOI contains three trees next to a road, and the captured image contains two trees next to a road, the sector in question will be removed from the matching step.

At step 710, the constraints are used by the matching module 110 to match against constraints from a database containing constraints extracted from the reference depiction data. If the captured depiction is of terrain, the terrain matching module 114 performs matching against the database, which may also contain terrain satellite and bird's eye view images in some embodiments. The matching module 114 takes into account the relationships among the extracted features such as the geo-spatial relationship, the topological relationship, the geometry, size and shape of the objects as well as a subset of image features such as long edges, large homogeneous regions and land marks. According to one embodiment, dynamic graph matching using data structures such as semantic concept graphs is applied to the captured images and the database reference depictions. GIS data is further applied to improve accuracy of the results.

At step 712, a determination is made as to whether a match exists for the captured depiction, and the geographic location of the matching reference depiction is returned. The determination is based on a comparison between the first set of constraints from the captured depiction and the second set of constraints from the reference depictions stored in database 109. If the constraints match within a predefined threshold, the two sets of constraints are determined to be matches. At step 714, the method ends.

Figure 8B:
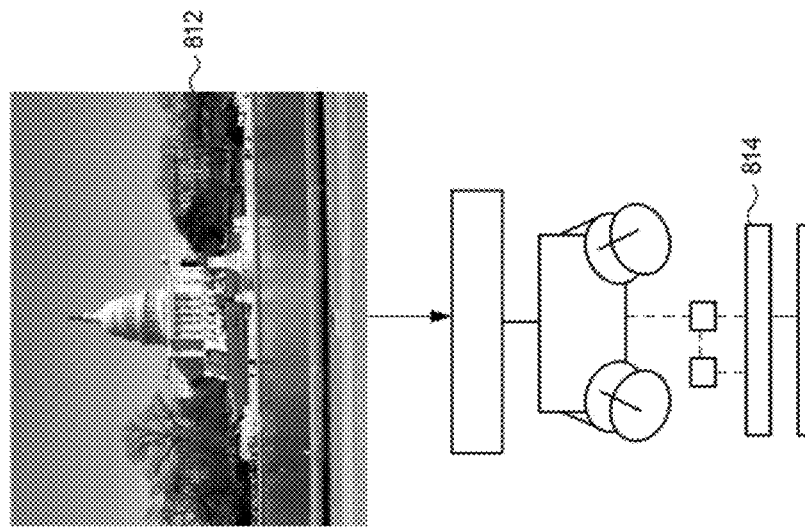
FIG. 8B illustrates a captured image and a corresponding graph representation in accordance with at least one embodiment of the present invention.
Figure 8A:
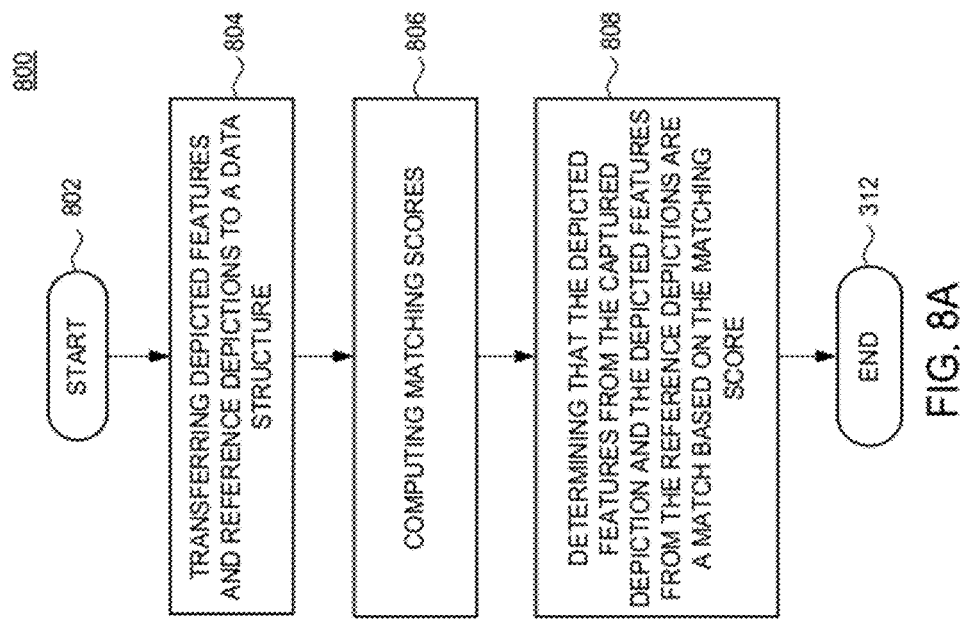
FIG. 8A depicts a flow diagram of a method for computing matching scores data in accordance with at least one embodiment of the present invention.

FIG. 8 depicts a flow diagram of a method 800 for computing matching scores data in accordance with at least one embodiment of the present invention. The method 800 represents the execution of the matching module 110 stored in memory 504 as executed by processor 502. The method 800 starts at step 802 and proceeds to step 804.

At step 804, captured depictions are transferred to a data structure, such as a graph, using the graphing module 408. According to one embodiment, the graph is a semantic concept graph, where semantic classes include buildings, roads, trees, pools/ponds, structure/sculptures, grass/lawns and parking lots, amongst others. Each node of the graph corresponds to a depicted feature from the captured image. The attribute of the node is the class that the depicted feature belongs to. If two extracted features are adjacent, there corresponding graph nodes are linked by an "edge" link. The link attribute is the relative position of the two nodes, i.e., left, upper-left, up, upper-right, right, bottom-right, bottom, bottom-left. In some embodiments, the links may also be "fuzzy" links, which represent confidence of the links or connections that may not necessarily be important. FIG. 8B illustrates an example of a tourist image 812 and the corresponding graph 814 with soft and hard links.

At step 806, maximum matching scores are computed for each building in the satellite images from the database, in all directions. The matching score of two graphs is the number of nodes that both have the same attributes (class labels) and the same kind of links to the building (number and types of links). A building in the reference depiction is said to be a semantic match of the building in the captured depiction if the building's matching score divided by the average matching score of all buildings is greater than a preconfigured threshold. Initially, a coarse matching is performed, where the extracted features of the captured depiction are matched with the extracted features of the reference depictions in database 109, resulting in an initial set of candidate matches. A fine matching is then performed between the respective extracted features of the captured image and of the set of candidate matches.

Figure 9:
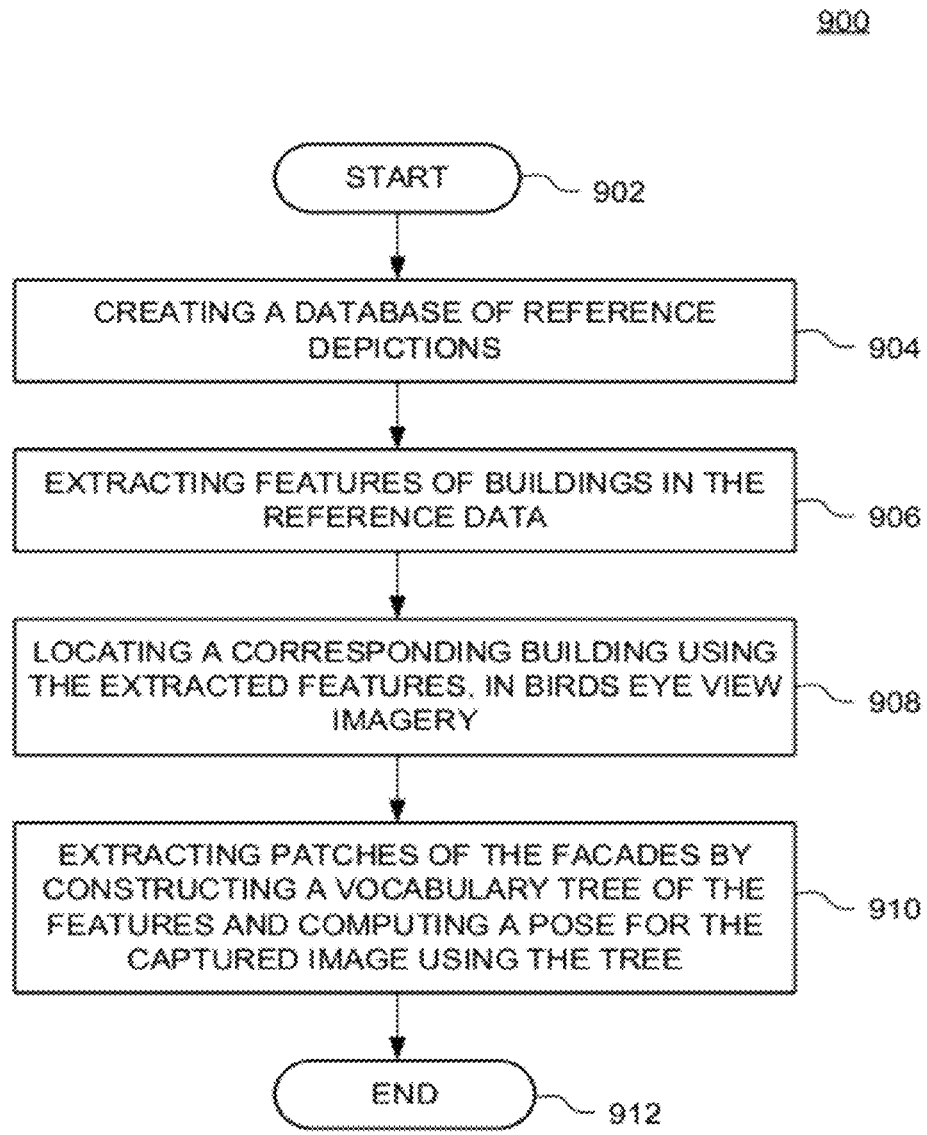
FIG. 9 depicts a flow diagram of a method for matching buildings using building features in accordance with at least one embodiment of the present invention.

FIG. 9 depicts a flow diagram of a method 900 for matching buildings using building features in accordance with at least one embodiment of the present invention. The method 900 represents the execution of the matching module 508 stored in memory 504 as executed by processor 502. The method 900 starts at step 902 and proceeds to step 904.

At step 904, a database of SAT, BEV and oblique aerial imagery (OAI) images is created by the matching module 508. The database may contain several areas of interest that are generally known to be local to a captured image. A specific location of the captured depiction is not known. The SAT, BEV and OAI imagery contains several buildings from an urban environment. According to one embodiment, a possible source of the imagery is Microsoft's Bing® Web service. The OAI images are warped to align with the SAT image coordinate system, thereby aligning the ground plane for the OAI images. In one embodiment, the dominant city block direction in the SAT imagery is determined and the BEV and OAI imagery is rotated before performing the warping.

At step 906, facades of the buildings in the SAT imagery are extracted. To ensure least distortion, in one embodiment, only the facade planes which face the heading direction of the particular BEV and OAI image are considered. In some embodiments, methods such as vertical vanishing point estimation are performed for grouping building edges into line segments and those corresponding to city block axes are removed. Then, image rectification is performed by mapping the vanishing point to a point at infinity, causing the building façade edges in the rectified BEV and OAI images to become parallel to the image scan lines.

According to one embodiment, building edges and facades (SAT Edge Extraction) are extracted from BEV and OAI images by detecting building contours in the overheat SAT imagery as chains of line-segments, each corresponding to one face of a building. The chaining is achieved by linking the edges into edge chains based on proximity and then fitting the line segments to the edge chains. The line segments are split wherever the deviation of the edges from the fitted line segment becomes greater than a predefined threshold value. Consistent line segments are merged into longer line segments and the overall process is iterated a few times.

From the extracted line segments, only those along the dominant façade direction in the BEV/OAI are kept. The kept segments are warped into the rectified BEV/OAI image coordinate system and are then mapped to the bottom of the buildings. Tops of the buildings are determined by sliding the mapped line segments horizontally. In some embodiments, building tops are determined using a Graph Cut optimization of an objective function. Then, four corners of each façade are determinable and mapped back to the unrectified BEV/OAI imagery for texture retrieval.

The method 900 then proceeds to step 908 where a building corresponding to the captured image is found using the extracted facades in the BEV images. For a given pixel q in the captured image, the local self-similarity descriptor dq is computed by defining a patch centered at q and correlating it with a larger surrounding image region Rq to form a local "correlation surface" which is then transformed into a binned log-polar representation to account for local spatial affine deformations. In one embodiment, the matching is performed as disclosed in the paper entitled "Matching local self-similarities across", E. Schechtman and M. Irani, CVPR 2007, hereby incorporated by reference in its entirety.

At step 910, patches of the façade are extracted by constructed a vocabulary tree of the features. The layout of local patches within each facade of buildings is used to create a statistical description of the facade pattern. Such statistical descriptions do not get affected by the appearance and viewpoint changes. A uniform grid of points on each extracted façade is sampled and a "self-similarity" descriptor at each point is obtained. In one embodiment, an adaptive Vocabulary Tree (ADT) structure is used where each feature from each façade populates the ADT based on the frequency of the façade IDs.

According to some embodiments, pose estimation is further performed to facilitate in localizing the captured image for more precise geolocalization. Six degrees of freedom (6DOF) pose is established for the sensor 103 or capturing camera. In one embodiment, seven point correspondences are established between the street view and BEV/OAI imagery in a structure surrounding the matched façade. The correspondences are used to estimate a fundamental matrix F between the street view and BEV/OAI images and thus the epipole of the BEV/OAI images corresponds to the street view camera location in the BEV/OAI coordinate system.

The sensor 103 location in the BEV/OAI image is mapped to absolute lat-long coordinates using the ground plane correspondence with the SAT imagery. Finally, the metric (cms/pixel) information in the SAT image is used to estimate the sensor 103 focal length which can be used in conjunction with any knowledge about the CCD array dimensions of the sensor 103 to establish the field-of-view as well. The look-at direction is also estimated using the metric information available from the SAT imagery by a simple trigonometric calculation known to those of ordinary skill in the art.

Figure 10:
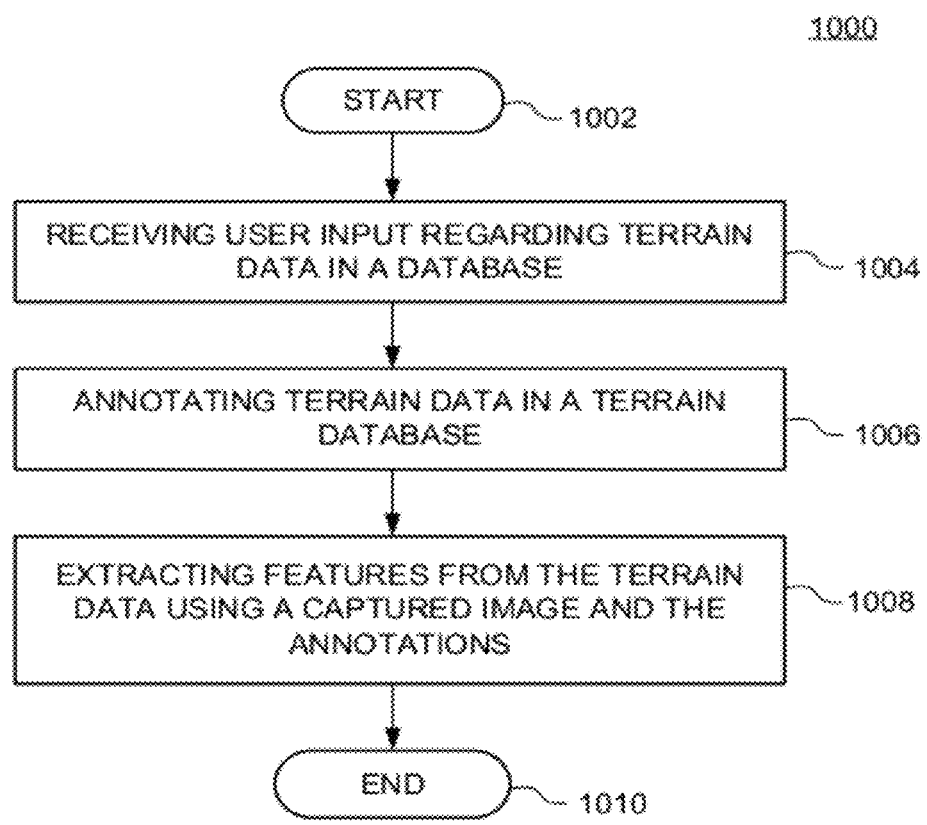
FIG. 10 depicts a flow diagram of a method for feature extraction in accordance with at least one embodiment of the present invention.

FIG. 10 depicts a flow diagram of a method 1000 for feature extraction in accordance with at least one embodiment of the present invention. The method 1000 represents the execution of the registration module 506 stored in memory 504 as executed by processor 502. The method 1000 starts at step 1002 and proceeds to step 1004.

At step 1004 the method 1000 receives user input regarding three-dimensional terrain data in the database 512. Through a user interface provided by the computer 500, the user enters annotations of the 3D data in the database, i.e., adds onto the existing annotations to improve matching functionality. At step 1008, features are extracted from the terrain data using a captured depiction and the annotations of the user. The method ends at step 1010.

Figure 11A:
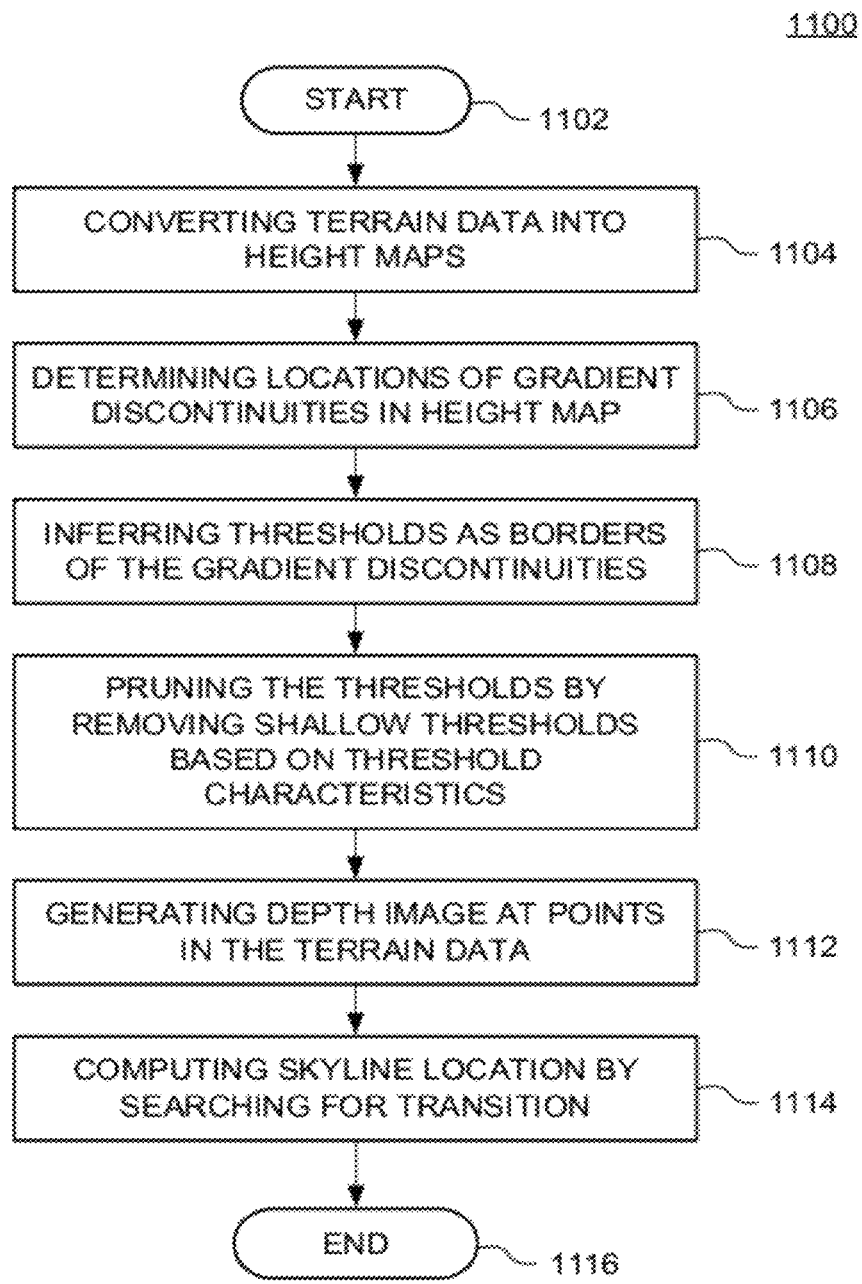
FIG. 11A depicts a flow diagram of a method for geolocalizing an image of a skyline in accordance with at least one embodiment of the present invention.

FIG. 11 depicts a flow diagram of a method 1100 for geolocalizing an image of a skyline in accordance with at least one embodiment of the present invention. The method 1100 represents the execution of the terrain matching module 528 stored in memory 504 as executed by processor 502. The method 1100 starts at step 1102 and proceeds to step 1104.

At step 1104 three-dimensional terrain data stored in database 512 is converted into height maps. In some embodiments, the 3D data is LIDAR or DEM data. The method 1100 then proceeds to step 1106, where the method determines locations of ridges and basis using, according to one embodiment, a watershed algorithm. Gradient discontinuities, such as basins are found in the height map where water accumulates. At step 1108, thresholds such as ridges, for example, are found as borders of each gradient discontinuity. When the method 1100 proceeds to step 1110, the ridges and basis are pruned by removing shallow thresholds based on their characteristics. According to one embodiment, the characteristics comprise length and curvature of the thresholds.

Figure 11B:
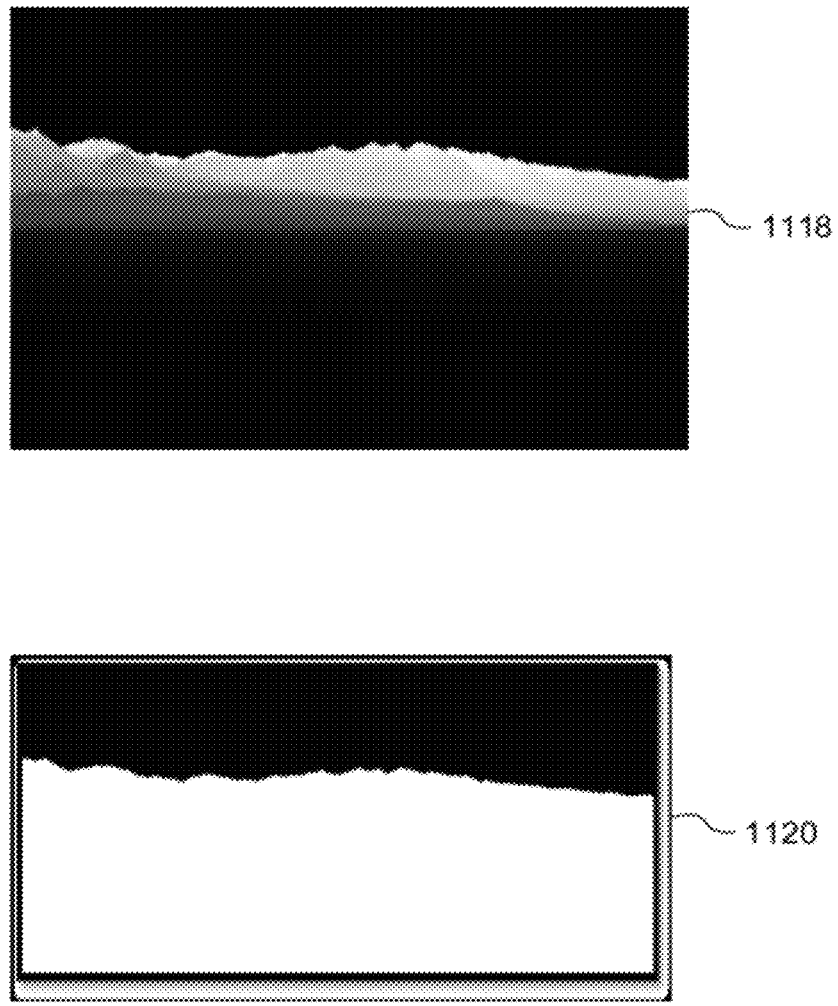
FIG. 11B is an illustration of a depth image and transition image for geolocalizing a skyline in accordance with at least one embodiment of the present invention.

At step 1112, the method generates a depth image 1118 as shown in FIG. 11B at each point in a plurality of points in the 3D terrain data. From the depth image information, the method 1100 will compute a skyline by searching for transition between the depths at step 1114. Since the sky region has infinite depth and the non-sky region has finite depth, skylines can be efficiently computed by searching for the transition between infinite depth to finite depth in the vertical direction, as shown in image 1120 of FIG. 11B. According to one embodiment, the result is a dense polyline of the extracted skyline.

Figure 12:
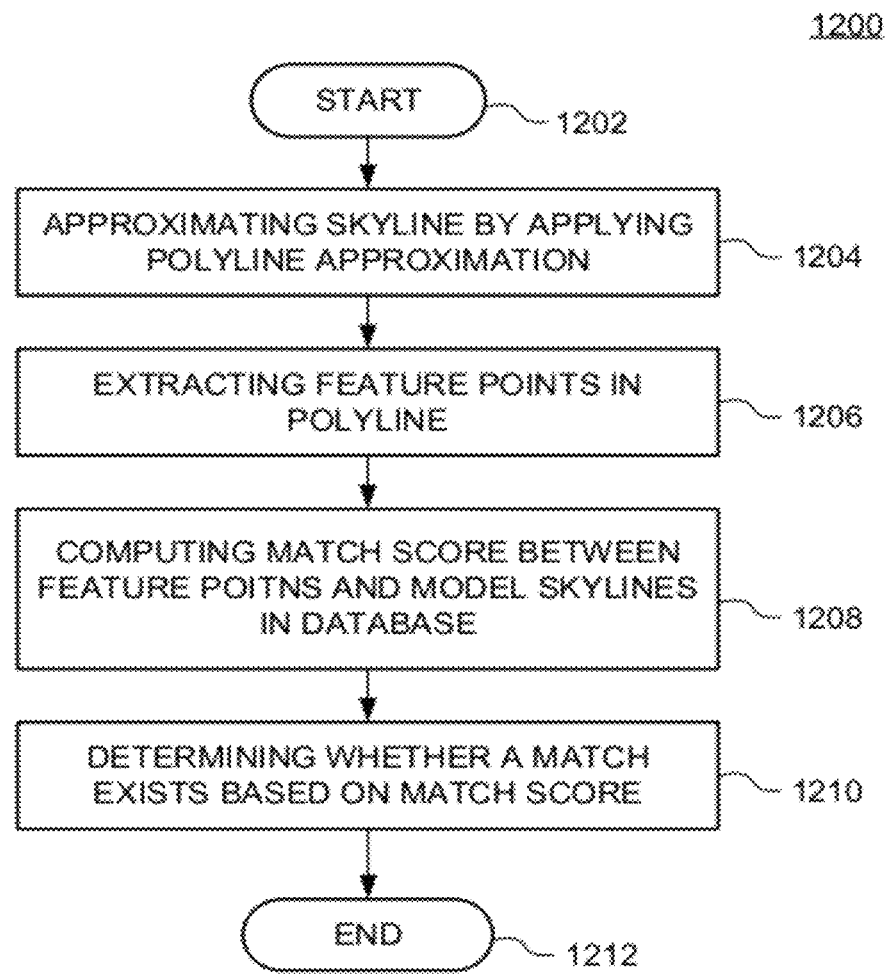
FIG. 12 depicts a flow diagram of a method for localizing a captured depiction of a skyline in accordance with at least one embodiment of the present invention.

FIG. 12 depicts a flow diagram of a method 1200 for localizing a captured image of a skyline in accordance with at least one embodiment of the present invention. The method 1200 represents another embodiment of the execution of the terrain matching module 528 stored in memory 504 as executed by processor 502. The method 1200 starts at step 1202 and proceeds to step 1204.

At step 1204, the module 528 approximates a skyline in a captured image by applying a polyline approximation technique. According to one embodiment, the polyline segment is approximated by starting one line segment connecting two ends of the skyline. A progressive approximation procedure improves the approximation by splitting the line segments in the previous approximation until the error between the polyline and the original skyline is less than a preconfigured threshold.

At step 1206, feature points are extracted from the polyline. The feature points are "key" feature points which are locations on the polyline where the variance of the neighbor pixels exceeds a given threshold. The method then proceeds to step 1208, where match scores are computed between feature points and model skylines in database 512. For each key feature point in the skyline, a key feature point from the model skyline is found that best matches the key feature point. The matching score between two key feature points is, in one embodiment, the Chamfer distance between the two local regions centered on those key feature points.

Given best matches for each key feature points, random sample consensus (RANSAC) algorithms are applied to find the best transformation between the two skylines that result in the maximum number of inlier matching pairs.

With less discriminative skylines, ridge matching and verification is further applied. Each ridge is represented by polyline approximation and for each line segment of the ridges in a given image, the distance to and angle difference between the closed ridge segment of the model image is computed. If the distance and angle segment are below a predefined threshold value, then the segment is deemed an inlier segment. The percentage of inlier segments over the total number of ridge segments is used as a similarity measure.

At step 1210, the method 1200 determines whether a match exists based on the match scores computed in step 1208. The method 1200 then ends at step 1210.

Various elements, devices, modules and circuits are described above in association with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. A method for determining a geographic location of a scene in a captured depiction comprising:
    extracting a first set of features and spatial interrelationships between the first set of features from the captured depiction by algorithmically analyzing the captured depiction;
    semantically classifying the first set of features to produce a semantically classified first set of features;
    matching the semantically classified first set of features and their corresponding spatial interrelationships against one or more second sets of semantically classified features and corresponding spatial interrelationships associated with reference depictions having known geographic locations, wherein one or more of the reference depictions represent a different perspective of the scene than the captured depiction does;
    when the matching is successful, identifying the geographic location of the scene in the captured depiction based on a known geographic location of a matching reference depiction from the reference depictions; and
    electronically representing each of the semantically classified first and second sets of features and their spatial interrelationships in corresponding concept graphs;
    and wherein said matching comprises comparing the concept graph representing the semantically classified first set of features and their spatial interrelationships against a set of concept graphs representing the one or more second sets of semantically classified features and their spatial interrelationships.

2. The method of claim 1, wherein the spatial interrelationships among the first set of extracted features comprise a relative geometric configuration.

3. The method of claim 1 wherein the matching further comprises:
    coarsely filtering the reference depictions to select a set of candidate matches; and
    computing a matching score between the first set of extracted features, and the one or more second sets of semantically classified features for the set of candidate matches.

4. The method of claim 1 further comprising forming a set of constraints based on the first set of extracted features, wherein the constraints are one or more of feature similarity constraints, geometrical constraints, topological constraints and geospatial constraints.

5. The method of claim 1 wherein the extracting the spatial interrelationships further comprises calculating a pose for a sensor associated with the captured depiction.

6. The method of claim 1, wherein the reference depictions further comprises satellite (SAT) imagery and oblique aerial imagery (OAI).

7. The method of claim 6, wherein the one or more second sets of semantically classified features includes one or more features extracted by combining the SAT imagery, the OAI imagery, and associated three-dimensional (3D) model data.

8. The method of claim 7 wherein the features extracted by combining the SAT and OAI imagery include one or more of outlines and facades of buildings.

9. The method of claim 8, further comprising:
    extracting the outlines of buildings using the 3D model data and the SAT imagery;
    locating a corresponding building, in the OAI imagery, using the extracted outlines; and
    extracting facades for the corresponding building using the located building.

10. The method of claim 1 further comprising:
    extracting one or more features from terrain data associated with the reference depictions.

11. The method of claim 10 wherein the terrain data is three dimensional (3D) terrain data.

12. The method of claim 10 further comprising:
    computing the location of a skyline from the terrain data.

13. The method of claim 1 further comprising:
providing an interface to a user showing the captured depiction and one or more matches within the reference depictions on an interactive display.

14. The method of claim 1 further comprising:
performing the method of claim 1 with respect to each of a plurality of captured depictions, to derive a corresponding geographic location for each of the captured depictions; and
using the derived geographic locations to construct a geographically indexed database of the captured depictions.

15. The method of claim 14, further comprising:
providing an interactive search engine responsive to a query specifying a geographic location by returning one or more of the captured depictions whose corresponding derived location matches the location specified by the query.

16. The method of claim 14, further comprising: displaying the captured depictions on an interactive map, wherein the depictions are each displayed in a position corresponding to their derived geographic location.

17. An apparatus for determining a geographic location of a scene in a captured depiction comprising a processor for executing a plurality of modules, the modules comprising:
a registration module configured to extract a first set of features and spatial interrelationships between the first set of features from the captured depiction by algorithmically analyzing the captured depiction, semantically classify the first set of features to produce a semantically classified first set of features, and electronically represent the semantically classified first set of features and their spatial interrelationships in a first concept graph;; and
a matching module configured for:
matching the semantically classified first set of features and their corresponding spatial interrelationships against one or more second sets of semantically classified features and their corresponding spatial interrelationships associated with reference depictions having known geographic locations,
wherein matching comprises:
comparing the concept graph representing the first set of semantically classified features and their spatial interrelationships against a set of concept graphs representing the one or more second sets of semantically classified features and their corresponding spatial interrelationships,
wherein one or more of the references depictions represent a different perspective of the scene than the captured depiction does; and
identifying, when the matching is successful, the geographic location of the scene in the captured depiction based on a known geographic location of a matching reference depiction from the reference depictions.

18. The apparatus of claim 17 wherein the processor:
performs the method of claim 1 with respect to each of a plurality of captured depictions, to derive a corresponding geographic location for each of the captured depictions; and
the registration module uses the derived geographic locations to construct a geographically indexed database of the captured depictions.

19. The apparatus of claim 17, further comprising:
providing an interactive search engine responsive to a query specifying a geographic location by returning one or more of the captured depictions whose corresponding derived location matches the location specified by the query.

20. A method for determining a geographic location of a scene in a captured depiction comprising:
extracting a first set of features and spatial interrelationships between the first set of features from the captured depiction by algorithmically analyzing the captured depiction;
semantically classifying the first set of features;
matching the semantically classified first set of features and their corresponding spatial interrelationships against one or more second sets of semantically classified features and corresponding spatial interrelationships extracted partially from reference depictions, the reference depictions comprising at least a combination of satellite, aerial imagery and associated three-dimensional (3D) model data having known geographic locations, wherein one or more of the reference depictions represent a different perspective of the scene than the captured depiction does, and the one or more second sets of semantically classified features include one or more outlines and facades of buildings determined by:
extracting the outlines of buildings using the 3D model data and the satellite imagery;
locating a corresponding building, in the aerial imagery, using the extracted outlines; and
extracting facades for the corresponding building using the located building; and
when the matching is successful, identifying the geographic location of the scene in the captured depiction based on a known geographic location of a matching reference depiction from the reference depictions.

* * * * *